Feb. 8, 1949. H. STRAUSSER 2,461,399
CONFECTIONERY
Filed June 18, 1946
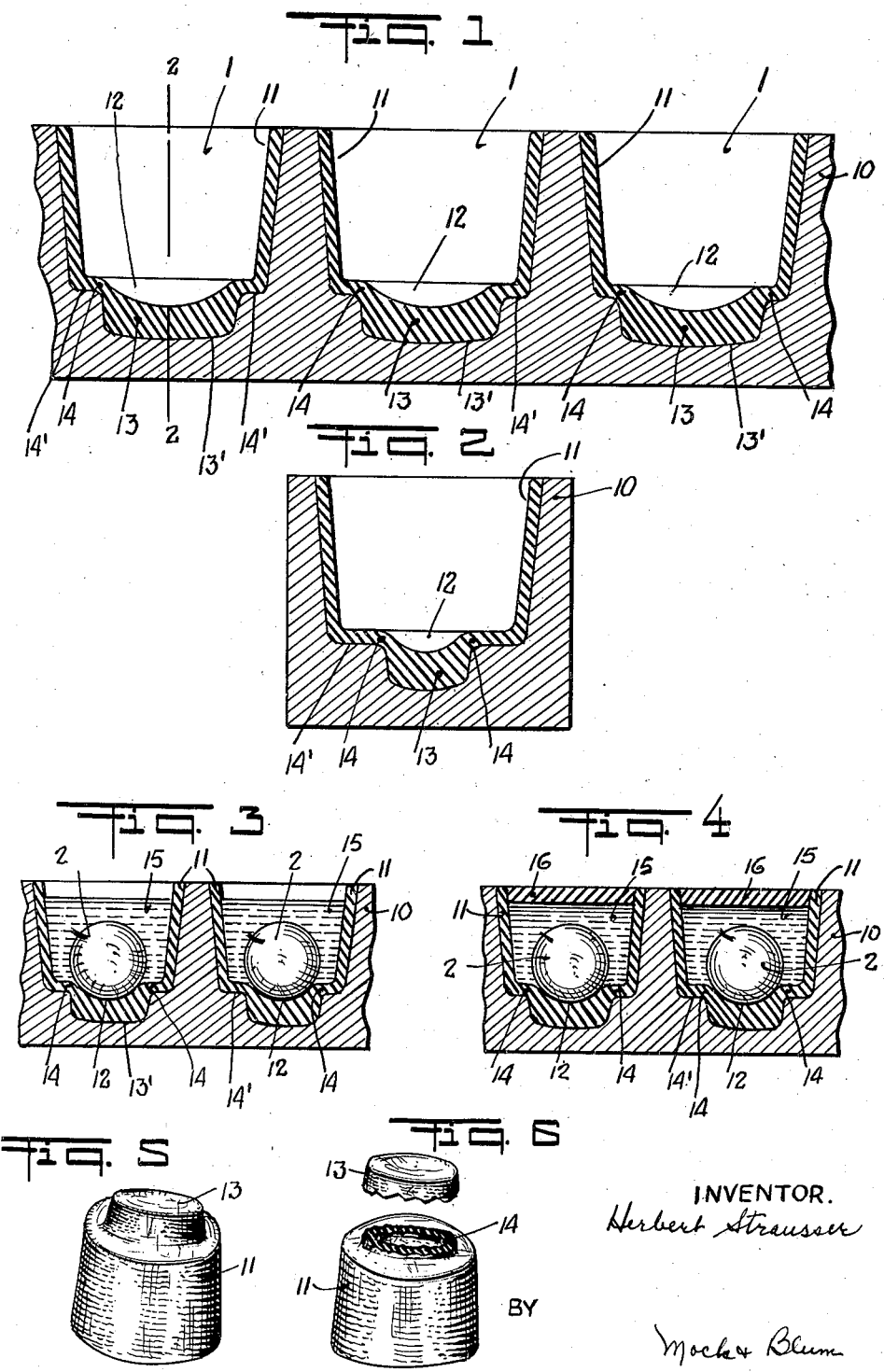
INVENTOR.
Herbert Strausser
BY
Mock & Blum
ATTORNEYS Patented Feb. 8, 1949

2,461,399

UNITED STATES PATENT OFFICE 2,461,399

CONFECTIONERY

Herbert Strausser, New York, N. Y.

Application June 18, 1946, Serial No. 677,590

6 Claims. (Cl. 99—138)

This invention relates to chocolate coated candies and has particular relation to candies consisting of a chocolate shell comprising a liquid or semi-liquid confection.

Chocolate coated candies consisting of an outer shell of chocolate, housing a cherry and filled with a liquid or semi-liquid mixture of brandy and confection, are usually prepared by first filling a liquid or semi-liquid chocolate composition into a suitable metal mold to form a solid chocolate shell having substantially the shape of a truncated cone or an inverted cup. After the solidification of the chocolate layer in the mold, the cherries are placed in the chocolate shells which are then filled with the liquid or semi-liquid confection. Finally a bottom portion is formed, for example by pouring a semi-liquid chocolate composition into the filled chocolate shells, permitting them to cool and solidify and removing the cooled candies from the molds.

In consuming chocolates thus prepared and having the shape of a truncated cone or inverted cup, dripping of the liquid or semi-liquid confection can be hardly avoided when a portion of the chocolate is bitten off.

The main object of the present invention is to provide improved chocolates of the above described type which do not show the disadvantage of dripping when eaten.

Another object of this invention is to prepare such improved chocolates in a simple manner and to obtain chocolates which correspond in every respect to the known products of this type with the exception of the undesirable dripping.

Further objects and the advantages of the invention will be apparent from the following specification and claims and the appended drawings which illustrate, by way of example, a preferred method of carrying out this invention, and in which Figure 1 is a partial sectional view of a device comprising a plurality of molds adapted to be used in carrying out the invention and the chocolate shell or coating formed therein;

Figure 2 is a vertical, sectional view along line 2—2 of Figure 1;

Figures 3 and 4 are sectional views similar to that shown in Figure 1 illustrating later stages of the manufacture;

Figure 5 is a perspective view of a chocolate prepared in accordance with this invention, while Figure 6 is a similar view showing the upper projecting part of the chocolate bitten off.

Referring now to the drawings, 10 denotes a multiple die or mold consisting of a heat-conducting material, such as metal, and provided with a plurality of cavities 1, the design and dimensions of which correspond to the shape and dimensions of the individual chocolates to be made. A chocolate shell is prepared by introducing into the cavities of the mold a chocolate syrup or composition of suitable consistency in the conventional manner. According to the present invention, the bottom of the individual cavities of the die or mold 10 is provided with an annular shoulder 14' and a depression or recess 13' and, in accordance with this design of the cavities, a chocolate shell of the shape shown in Figure 5, provided with a projecting part 13, is formed. After solidification of the chocolate shell 11, cherries 2 are placed in the recesses 12 of the chocolate shell, as shown in Figure 3, and the shell is filled with the desired liquid or semi-liquid confection 15, as shown in Figures 3 and 4. Finally, the bottom portion 16 of the chocolates is formed by pouring a suitable chocolate composition onto the surface of the liquid 15. After sufficient cooling, the chocolates are removed from the die.

When consuming the chocolates of the new shape shown in Figure 5, the projecting top portion 13, is bitten off, and the liquid confection housed by the remaining portion of the chocolate shell provided with a circular edge 14 and the liquid confection contained therein can be consumed without dripping of said liquid.

It will be apparent from the above specification and drawings that this invention is not limited to the specific details described above and shown above and illustrated in the drawings, and may be carried out with various modifications. For example, the projecting top portion 13, which is shown in the drawing with elliptical cross section, may have the shape of a frustrated cone of circular cross-section, and the height of this top portion, as well as the design of shoulder 14 may vary. These and other modifications may be made without departing from the scope of the invention defined in the appended claims.

The chocolate shell and the liquid confection contained therein may be of the conventional composition.

What is claimed is:

1. As a new product, a chocolate coated candy, comprising an outer shell consisting of a chocolate composition, a semi-liquid to liquid confection in said shell, the upper surface layer of said shell being provided with a projecting integral top portion having a greater wall thickness than the rest of the shell.

2. As a new product, a chocolate coated candy, comprising an outer shell consisting of a chocolate composition, a semi-liquid to liquid confection in said shell, the upper surface layer of said shell being provided with a projecting integral top portion connected by means of an annular shoulder to said surface layer, said top portion being of greater thickness than said shoulder.

3. As a new product, a chocolate coated candy, comprising an outer sheel having substantially the shape of a frustrated cone, and consisting of a chocolate composition, a semi-liquid to liquid confection in said shell, the upper surface layer of said shell being provided with a projecting integral top portion having substantially the shape of a frustrated cone and a greater wall thickness than the rest of the shell.

4. As a new product, a chocolate coated candy, comprising an outer shell consisting of a chocolate composition, a semi-liquid to liquid confection and a cherry in said shell, the upper surface layer of said shell being provided with a projecting integral top portion connected by means of an annular shoulder to said surface layer, said top portion being of greater thickness than said shoulder.

5. As a new product, a chocolate coated candy, comprising an outer shell having substantially the shape of a frustrated cone, and consisting of a chocolate composition, a semi-liquid confection in said shell, the upper surface layer of said shell being provided with a projecting integral top portion by means of an annular shoulder to said surface layer, the said projecting top portion having a stronger wall than the wall of the shoulder which connects it to the body portion.

6. As a new product, a chocolate coated candy, comprising an outer shell consisting of a chocolate composition, a semi-liquid confection and a cherry in such shell, the upper surface layer of said shell or container being provided with a projecting integral top portion connected by means of an annular shoulder to said surface layer, the said projecting top portion having a stronger wall than the wall of the shoulder which connects it to the body portion.

HERBERT STRAUSSER.

REFERENCES CITED

The following references are of record in the file of this patent:

UNITED STATES PATENTS

| Number | Name | Date |
| --- | --- | --- |
| 943,945 | Liebich | Dec. 21, 1909 |
| 1,518,737 | Griffith | Dec. 9, 1924 |
| 1,573,078 | McCool | Feb. 16, 1926 |